US008596586B2

(12) United States Patent
Schroeder

(10) Patent No.: US 8,596,586 B2
(45) Date of Patent: Dec. 3, 2013

(54) HIGH-LIFT SYSTEM FOR AN AIRCRAFT, METHOD FOR DISPLACING A LIFT FLAP, AND AIRCRAFT HAVING A HIGH-LIFT SYSTEM

(75) Inventor: Karsten Schroeder, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 17 days.

(21) Appl. No.: 13/490,009

(22) Filed: Jun. 6, 2012

(65) Prior Publication Data

US 2012/0292454 A1    Nov. 22, 2012

Related U.S. Application Data

(63) Continuation of application No. PCT/EP2010/068766, filed on Dec. 2, 2010.

(60) Provisional application No. 61/267,267, filed on Dec. 7, 2009.

(30) Foreign Application Priority Data

Dec. 7, 2009    (DE) .......................... 10 2009 057 340

(51) Int. Cl.
*B64C 3/50*    (2006.01)
(52) U.S. Cl.
USPC ............................ 244/214; 244/215; 244/213
(58) Field of Classification Search
USPC .................................. 244/213, 214, 215, 1 N
See application file for complete search history.

(56) References Cited

U.S. PATENT DOCUMENTS

| 2,117,607 | A | * | 5/1938 | Griswold | 244/216 |
| 3,273,826 | A | | 9/1966 | Jackson | |
| 3,949,957 | A | * | 4/1976 | Portier | 244/210 |
| 5,570,859 | A | * | 11/1996 | Quandt | 244/213 |
| 5,845,873 | A | * | 12/1998 | Millard | 244/1 R |
| 6,375,126 | B1 | | 4/2002 | Sakurai et al. | |

(Continued)

FOREIGN PATENT DOCUMENTS

| CA | 2522553 A1 | 4/2006 |
| DE | 19925560 A1 | 12/2000 |

(Continued)

OTHER PUBLICATIONS

International Searching Authority, International Search Report Dated Nov. 7, 2011 for International Application No. PCT/EP2010/068766.

(Continued)

*Primary Examiner* — Christopher P Ellis
*Assistant Examiner* — Medhat Badawi
(74) *Attorney, Agent, or Firm* — Ingrassia Fisher & Lorenz P.C.

(57) ABSTRACT

A high lift system is provided for an aircraft. The high lift system includes, but is not limited to a lift flap arranged on a wing and coupled to the wing so as to be movable relative to the wing, between a retracted position and at least one extended position. In the retracted position the lift flap rests against the wing, and in an extended position forms an air gap to the wing. The lift flap directed towards its trailing edge comprises at least one region of variable curvature, which region in an extended position of the lift flap extends towards the wing.

20 Claims, 6 Drawing Sheets

(56) References Cited

U.S. PATENT DOCUMENTS

| | | |
|---|---|---|
| 6,457,680 B1 | 10/2002 | Dobrzynski et al. |
| 6,789,769 B2 | 9/2004 | Mau et al. |
| 7,520,471 B2 | 4/2009 | Reckzed et al. |
| 8,006,941 B2 | 8/2011 | Lorkowski et al. |
| 8,025,257 B2 * | 9/2011 | Gyuricsko et al. ............ 244/214 |
| 2001/0038058 A1 | 11/2001 | Gleine et al. |
| 2006/0202089 A1 | 9/2006 | Reckzed et al. |
| 2010/0084508 A1 * | 4/2010 | Hirai et al. .................... 244/1 N |
| 2010/0219299 A1 | 9/2010 | Holzhausen |
| 2011/0011984 A1 | 1/2011 | Voss et al. |
| 2011/0095135 A1 * | 4/2011 | Miller et al. ............... 244/200.1 |
| 2011/0114795 A1 * | 5/2011 | Voss et al. .................... 244/213 |
| 2011/0248122 A1 | 10/2011 | Schlipf et al. |
| 2012/0061522 A1 * | 3/2012 | Sullivan et al. ............... 244/198 |

FOREIGN PATENT DOCUMENTS

| | | |
|---|---|---|
| DE | 102007024371 A1 | 11/2008 |
| DE | 102007024372 A1 | 11/2008 |
| EP | 1338506 A1 | 8/2003 |
| EP | 1645503 A1 | 4/2006 |

OTHER PUBLICATIONS

German Patent Office, German Office Action dated Jun. 30, 2011 for German Application No. 102009057340.2.

* cited by examiner

HIGH-LIFT SYSTEM FOR AN AIRCRAFT, METHOD FOR DISPLACING A LIFT FLAP, AND AIRCRAFT HAVING A HIGH-LIFT SYSTEM

CROSS-REFERENCE TO RELATED APPLICATIONS

This is a continuation of International Application No. PCT/EP2010/068766, filed Dec. 2, 2010, which claims priority to U.S. Provisional Patent Application No. 61/267,267, filed Dec. 7, 2009 and to German Patent Application No. 10 2009 057 340.2, filed Dec. 7, 2009, which are hereby incorporated by reference in their entirety.

TECHNICAL FIELD

The technical field relates to a high lift system for an aircraft, comprising at least one lift flap arranged on a wing, and at least one flap adjustment mechanism for moving the lift flap between a retracted and at least one extended position relative to the wing. Furthermore, the technical field also relates to a method for moving a lift flap, and to an aircraft with at least one high lift system.

BACKGROUND

From the desirability of the highest possible cruising speed and at the same time the lowest possible takeoff and landing speed, in modern commercial aircraft the need arises for high lift systems, which during takeoff and landing maneuvers can be activated to increase the lift coefficient. Generally speaking, this takes place by means of lift-enhancing flaps which are deflected into the airflow of the aircraft. In particularly widespread use are a host of different slats or leading edge flaps, as well as wing trailing edge flaps in single or multiple rows, with the aforesaid being arranged so as to be movable relative to the wing.

Movable slats, also referred to as extensible slats or leading edge flaps, for example in the form of so-called Krueger flaps, in a retracted position conform to the wing, and in so doing form, for example, part of the wing leading edge, or can be accommodated on the underside of the wing in a suitably formed recess in order to provide a continuous, flush surface. In one or several extended positions, slats are spaced apart or offset from the leading edge of the wing, thus forming a gap between the slat and the leading edge of the wing. From the incident flow towards the aircraft, high-energy airflow moves through the gap onto the profile top of the wing where it shifts the stall towards larger angles of attack. Leading edge flaps can be deflected into the incident flow towards the aircraft, depending on their design, with or without the formation of a gap. At the same time in both the above-mentioned flaps on the leading edge of the wing both the surface of the wing and its curvature are increased.

Commonly used slats or leading edge flaps, which for the sake of simplicity are hereinafter generally referred to as "lift flaps", comprise a rigid structure whose shape matches the requirements of the wing configuration for cruise flight without activation of the high lift system (clean wing configuration). In this manner the geometry of the gap between slats and leading edges of wings is determined.

In DE 10 2006 053 259 A1 and WO 2008/058695 A1 a high lift system for a wing of an aircraft is presented, in which for the purpose of increasing lift, lift flaps can be moved from a retracted position to extended positions, where a gap between the high lift flaps and the wing can be opened or closed independently of the position of the high lift flaps. In this manner optionally achieving an improved maximum lift coefficient or an improved glide ratio with less noise generation is possible. From DE 10 2007 063 583 A1 and WO 2009/083255 A1 a high lift system for an aircraft is known in which a lift flap is connected to a wing, and can be adjusted by means of at least two adjustment devices, arranged so as to be spaced apart from each other in spanwise direction, in each case by means of a first lever and a second lever.

In known high lift systems with gap-forming lift flaps the gap formed becomes narrower or tapers off between a front of the lift flap and the leading edge of the wing, when viewed downstream frequently to a minimum gap dimension. However, there is the option of known high lift systems with a gap that does not form a gap that tapers off downstream. This is because the normally rigid lift flap may comprise a shape, positioning and deflection that may be limited by the external (e.g. kinematic) positioning boundary conditions, and thus may not allow an ideal converging gap. In this design significantly reduced aerodynamic lift enhancement is achieved when compared to that of an aerodynamically optimal design with a gap that tapers off in downstream direction. Normally an outer geometry of the lift flap is matched to cruise flight, and the surface facing the leading edge of the wing as a result of installations in the wing cannot assume any desired shape. Generally a convergent-divergent shape may not be aerodynamically optimal because the airflow directed towards the profile top loses part of its speed generated in the gap to the point where the flow exits from the gap.

Correspondingly, there may be a need for a high lift system with at least one lift flap arranged on a wing, and at least one flap adjustment mechanism for moving the lift flap between a retracted and at least one extended position relative to the wing, which high lift system provides an aerodynamic improvement and improves the effect, caused by the lift flap, of shifting the stall on the profile top of the wing to larger angles of attack. In addition, other needs, objects, desirable features and characteristics will become apparent from the subsequent summary and detailed description, and the appended claims, taken in conjunction with the accompanying drawings and this background.

SUMMARY

According to an embodiment, the lift flap comprises at least one region of variable curvature and is designed to form a gap to the wing. By means of the variable curvature, which may be varied between a retracted position and an extended position, the relative position of an edge of the lift flap, which edge projects to the wing, may be changed in an extended position. Consequently, a design of the gap is made possible in such a manner that the gap dimension, when viewed downstream, continuously tapers off. This continuous tapering off is to be understood to the effect that the narrowest cross section in the gap in the case of a rigid lift flap without additional curvature at the trailing edge is larger than the exit cross section, and between the narrowest cross section and the exit cross section there are no, or only few, divergent gap geometries. Generally, the gap geometry tapers in a monotone manner or in a manner that is monotone at least in some sections.

This convergent gap geometry provides an advantage in that the aerodynamic behavior relating to the increase in lift is improved by shifting the flow separation on the profile top to larger angles of attack and lift coefficients with identical dimensions of the lift flap, with identical kinematic boundary conditions and with an unchanged adjustment mechanism.

The tapering-off gap eliminates subsequent expansion/delay of the flow, thus preventing a reduction in speed of the air flowing through the gap. During the entire flow-through process through the gap the speed of the air flowing through is increased so that more effective increase of the flow energy on the profile top can take place, which increase is necessary for shifting the flow separation towards larger angles of attack.

It should be pointed out that the variable curvature of the lift flap need not be present over the entire span of the lift flap. A lift flap may also comprise a variable curvature only in part. In addition it would be imaginable for a high lift system to comprise several lift flaps, with only some of them providing a variable curvature at all.

In one example, the region of variable curvature of the lift flap can comprise flexibility and pre-formation that results in a first shape of curvature of the lift flap. In the first shape of curvature the lift flap may be designed to adjust the convergent gap to the wing in an extended position of the lift flap. The flexibility may, for example, be achieved in that the region of variable curvature comprises an initial tension as a result of which the lift flap generally insists on taking up the first shape of curvature, provided it is not mechanically forced to take up a second shape of curvature. The second shape of curvature may be adapted for stowability in a retracted position so that in a retracted position it forms a flush profile surface with the wing.

The flexibility may be provided by suitable material selection, by active spring elements, or by suitable forming or profiling of the components of the lift flap. The flexibility should be sufficiently small to prevent flutter or a continuous change in curvature in flight phases in which a high lift system is used. For example, fiber composite materials can be used by means of which a pre-tensioned or pre-curved flexible lift flap may be manufactured. A first shape of curvature may occur as a result of the initial tension that in an extended position is generally subjected to the incident airflow. In a retracted position the second shape of curvature may be achieved by pressing the lift flap against a limit stop or the like. The use of fiber composite materials is associated with a special advantage as a result of its fatigue strength and design flexibility by corresponding specification of the direction of the fibers. If appropriate other adequately flexible materials may also be used, for example metallic materials, which may also be installed with initial tension.

In a further embodiment of the high lift system according to the disclosure, an adjustment element may be integrated in or on the lift flap, which during deflection of the lift flap to an extended position deflects a pivotable trailing edge region of the lift flap. For example, a passive component in the form of a tension spring may be provided as an adjustment element, which tension spring draws in a pivotable trailing edge region, thus producing the first shape of curvature. At the same time a passive adjustment element in the form of a compression spring or with a particular material design or material combination of the lift flap may be implemented, which causes a spring effect. The pivotable trailing edge region need not necessarily be designed as a separate component, which means that a region of the lift flap is designed so as to be flexible, and consequently implements a trailing edge region that is pivotable as a result of adjustment elements in order to achieve a first or a second shape of curvature. Likewise, a separately manufactured, rigid or elastic, trailing edge region may be held by a hinge, by an elastic material transition, by a textile surface or the like, in order to form the pivotable trailing edge region. Apart from passive adjustment elements it would also be possible to use active adjustment elements, for example kinematic couplings, electrical, hydraulic and pneumatic actuators.

In an embodiment of the high lift system, the radius of curvature of the lift flap in the first shape of curvature in an extended position is smaller than in the second shape of curvature in a retracted position. This means that in the extended position the region of variable curvature is more strongly curved than in a retracted position. As a result, the gap between the leading edge of the wing, which leading edge comprises a curved profile, and the lift flap is generally continuously convergent. In addition, as a result of this the achievable lift coefficient is increased.

In another embodiment of the high lift system, the wing comprises a receiving surface onto which the lift flap can be moved in order to reach the retracted position. In this arrangement the receiving surface is formed in such a manner that it corresponds to a delimitation surface of the lift flap with a second shape of curvature. When placing the lift flap onto the receiving surface the lift flap that approaches the receiving surface in a first shape of curvature can be forced back to assume the second shape of curvature.

Generally, no active elements are required in order to achieve the change from the first shape of curvature to the second shape of curvature. It is adequate to form the lift flap that has been pre-formed to the first shape of curvature back to the second shape of curvature by placing it onto the suitable receiving surface in order to achieve as space-saving an accommodation as possible on the wing, and thus provide an aerodynamically predetermined shape of the wing for cruise flight.

In another embodiment of the high lift system, the receiving surface is arranged on an underside of the wing, wherein the lift flap is held so as to be rotatable on the leading edge of the wing. In another embodiment of the high lift system, the receiving surface is arranged at the top of the wing, and the lift flap is arranged at least in some part along the leading edge so as to be deflectable relative to the wing. In cruise flight the lift flap forms part of the wing leading edge.

According to another embodiment of the high lift system, the receiving surface comprises a receiving-surface protection device that protects the material of the wing from wearing through or from excessive pressure loads that may occur during moving and forcing back the lift flap to its second shape of curvature. Such a receiving-surface protection device can be corrosion-resistant and can comprise similar or identical thermal expansion characteristics as does the wing itself, or can be attached with the use of corresponding means in such a manner that different thermal expansion does not result in any damage. For example components comprising polytetrafluoroethylene (Teflon), stainless steel, Kevlar or other suitable materials may be considered.

A method according to an embodiment for moving a lift flap relative to a wing of an aircraft may also meet the above-mentioned need. The method can comprise the following steps. At first a lift flap is moved relative to the wing in order to create a gap between the wing and the lift flap. At the same time, or subsequent to the movement of the lift flap, a change in the curvature of the lift flap takes place so that the gap between the lift flap and the profile of the wing downstream is reduced in an aerodynamically adequate manner, for example in a monotone manner. It should be understood that strictly monotone convergence is not mandatory; in some areas the gap may also extend so as to be neither convergent nor divergent. However, clear downstream extensions that are divergent may be avoided. This is followed by movement of the lift flap towards the wing, wherein simultaneously or beforehand a change in the curvature in a direction opposite to that during the extension movement takes place. Furthermore, the need is also met by an aircraft with a high lift system as mentioned above.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
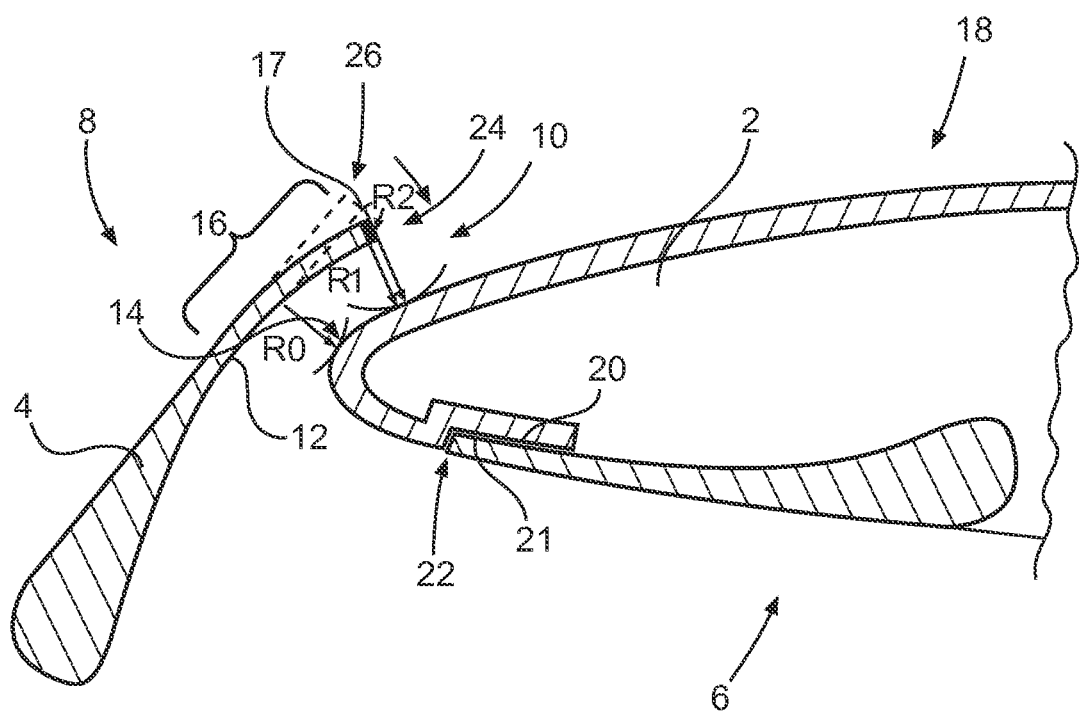
FIG. 1 shows a section of a high lift system according to an embodiment with a lift flap in an extended and in a retracted position.

FIG. 1 shows part of a high lift system on a wing 2 of an aircraft, with said high lift system comprising a lift flap 4 that is arranged on the wing 2, which lift flap 4 can be moved relative to the wing 2, for the purpose of increasing the lift, from a retracted position 6 to an extended position 8 shown as an example. In the retracted position 6 the lift flap 4 complements the wing 2 to form a smooth profile designed for cruise flight. In an extended position 8 the effective surface of the wing 2 is supplemented by the lift flap 4, wherein at the same time a gap 10 is formed that extends between a downstream surface 12 of the lift flap 4 and a wing leading edge 14.

It is understood that the lift flap 4 may assume several different extended positions 8 so that the effect of the high lift system can be changed if and when required. The lift flap 4 comprises a region 16 of variable curvature. In the extended position 8 the lift flap 4 comprises a first shape of curvature 24 with a first distance or radius of curvature R1 between the trailing edge of the lift flap and the surface of the wing 2 so that the trailing edge 17 of the lift flap 4 is directed most clearly towards the leading edge 14 of the wing 2.

As a result of this, the gap 10, when viewed downstream, becomes continuously or in a monotone manner narrower in an aerodynamically adequate manner to the airflow directed towards the profile top of the wing 2. This results in particularly effective introduction of high-energy air flow onto the top 18 of the wing 2 so that the stall is shifted towards larger angles of attack. For the sake of completeness it should be mentioned that the radius of curvature R2 corresponds to a distance between the trailing edge and the surface of the wing 2 in the second shape of curvature 26, and R0 is the minimum distance between the lift flap and the wing 2, which minimum distance is present in the second shape of curvature 26. According to the invention, R1 can be smaller than or equal to R0.

The lift flap 4 is designed in such a manner that the region of flexible curvature may also be deformed to a second shape of curvature 26 in such a manner that it can conform to a receiving surface 20. This receiving surface 20 may, for example, be located in a recess, or, as is the case in FIG. 1, at a step 22 to the outer contour of the wing 2. A receiving-surface protection device 21 may be affixed to the receiving surface 20 in order to prevent wear or crushing of the material of the receiving surface 20. The second shape of curvature 26 is indicated by the dashed lines of the lift flap 4 that is in an extended position 8.

Generally, the lift flap 4 is equipped in such a manner that by pressing the lift flap 4 to the receiving surface 20 a return from the first shape of curvature 24 to the second shape of curvature 26 takes place. An adjustment mechanism (not shown in detail in FIG. 1) can lock the lift flap 4 in the retracted position so that the force of the lift flap 4, with which force the lift flap moves back from the second curvature 26 to the first curvature 24, can be permanently absorbed.

Figure 2A:
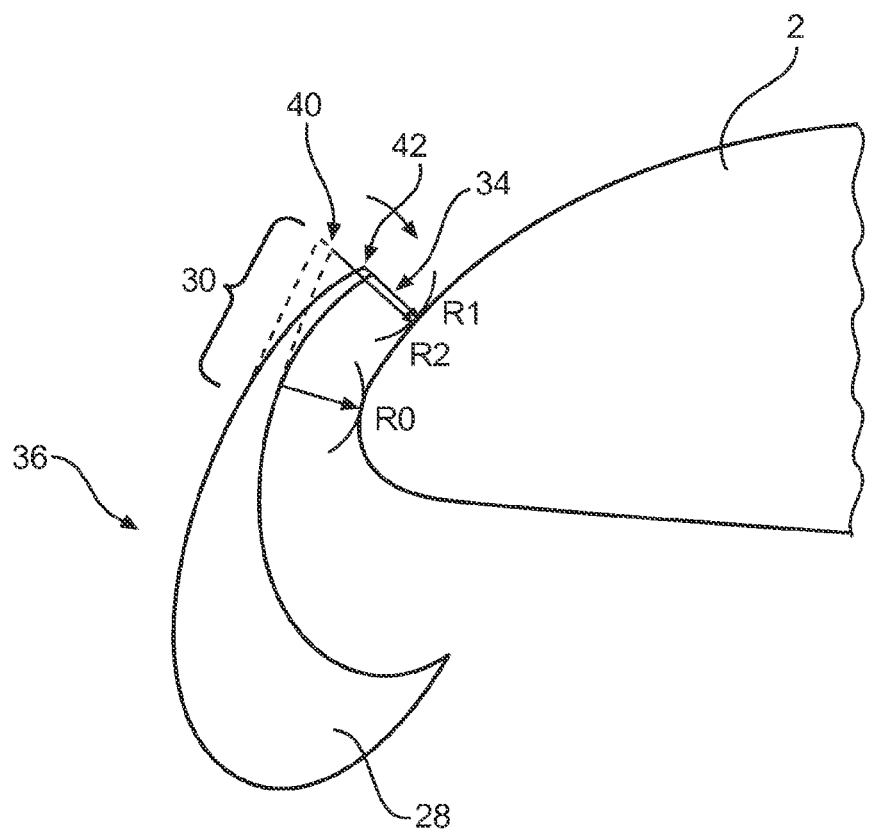
FIG. 2a and FIG. 2b show a further embodiment of a high lift system with a lift flap in an extended position and in a retracted position.
Figure 2B:
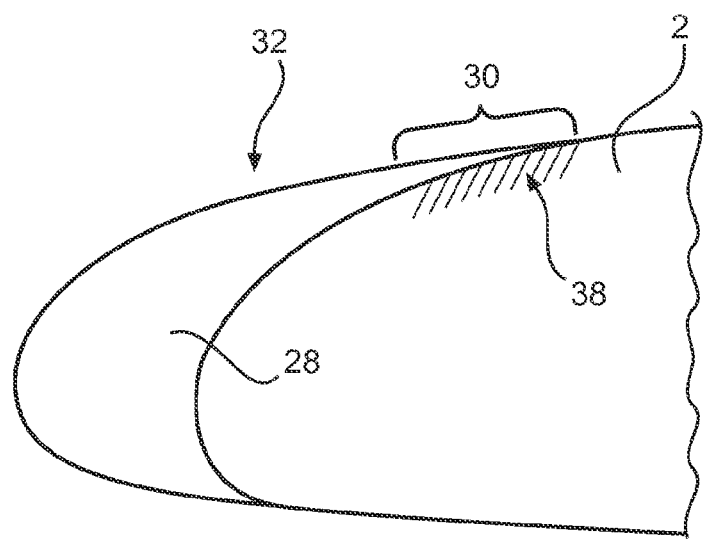

FIG. 2a shows a lift flap 28 that also comprises a region 30 of variable curvature. The lift flap 28 differs from the lift flap 4 shown in FIG. 1 in that in a retracted position it forms at least in part the leading edge profile of the wing 2. The region 30 of variable curvature is aligned in such a manner that a gap 34 in an extended position 36 downstream is continuously kept narrow, as a result of which narrow part the delay in the flow separation at the top of the profile of the wing 2 is improved. In the first shape of curvature 42 a distance or radius of curvature R1 between the trailing edge of the lift flap 4 and the surface of the wing 2 is achieved, which distance or radius of curvature R1 can be smaller than the minimum distance R0 between the lift flap 4 and the surface of the wing 2 in the second shape of curvature 40.

In the retracted position 32 the region 30 rests on a receiving surface 38 and in this manner is held in a second shape of curvature 40 that makes possible a continuous transition to the profile of the wing 2. In the extended position 36 the region of variable curvature can assume a first shape of curvature 42, which results in the desired characteristics of the gap 34.

Figure 3A:
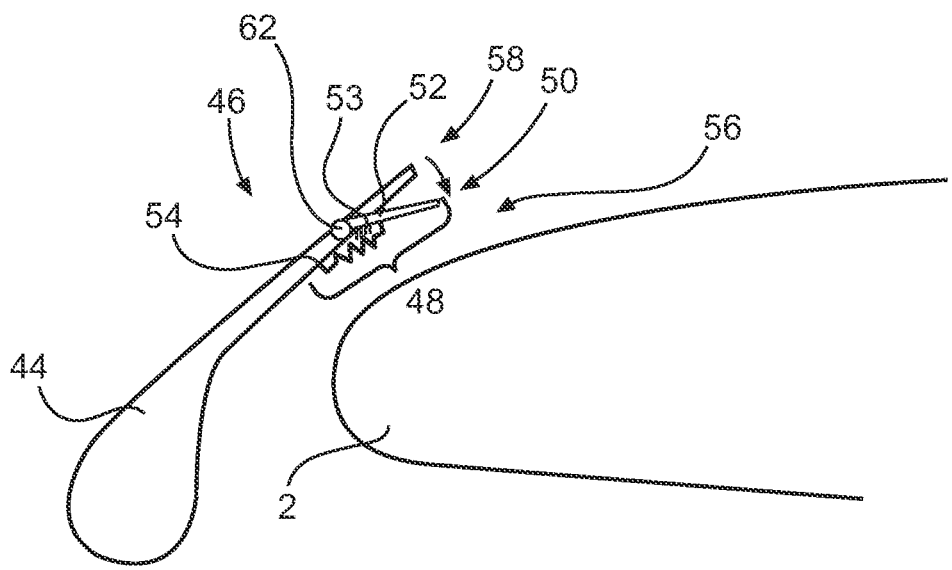
FIG. 3a and FIG. 3b show a further exemplary embodiment of a high lift system with a lift flap in an extended position and in a retracted position.
Figure 3B:
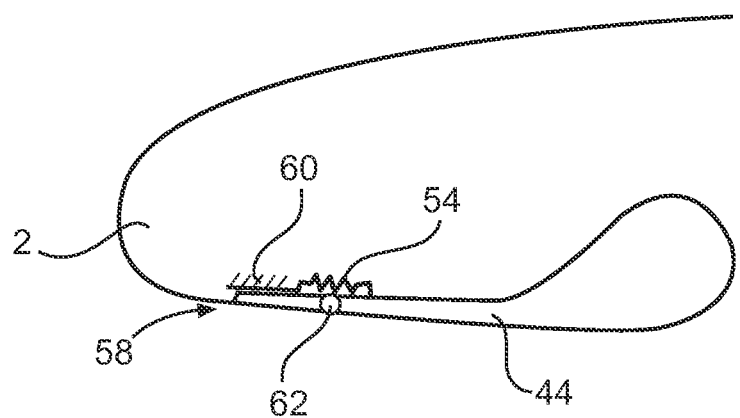

FIG. 3a and FIG. 3b show another exemplary embodiment, in which a lift flap 44 also comprises a region 48, which region 48 comprises a variable curvature. In the extended position 46 the lift flap 44 comprises a first shape of curvature 50 in which a pivotably arranged trailing edge region 52 is deflected towards the wing 2 by way of an adjustment element 54, which in the embodiment is designed as a tension spring but can also be implemented in the form of any suitable passive or active component. This results in a gap 56 that, when viewed downstream, becomes continuously narrower, or narrower in a monotone manner, in an aerodynamically adequate way, to the airflow directed onto the profile top of the wing 2. This results in an effective introduction of a high-energy airflow onto the top 18 of the wing 2 so that the aerodynamic stall is shifted towards larger angles of attack. In order to ensure defined deflection that is not excessive a limit stop 53 may be provided that may also be integrated in a hinge 62. The gap between the lift flap 4 and the wing 2 is predominantly convergent; only a very narrow region is shaped so as to tend to be divergent. The exit cross section of the gap between the pivoted trailing edge region and the surface of the wing is smaller than its entry cross section.

In a retracted position 63, shown in FIG. 3b, the lift flap 44 is in a retracted position, in which the pivotably arranged trailing edge region 52 is present in a second shape of curvature 58 that conforms to a corresponding receiving surface 60. As a result of this the adjustment element 54 is tensioned so that, during deflection of the lift flap 44, pivoting back of the movably held trailing edge region 52 the first shape of curvature 50 is assumed.

Figure 4:
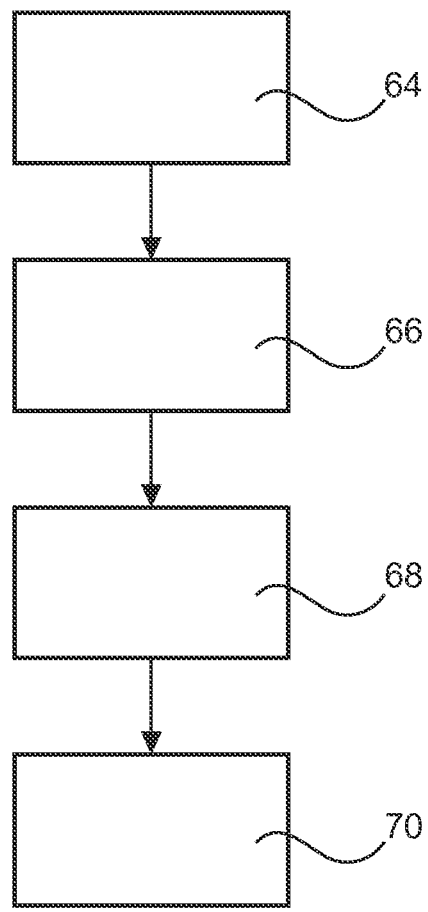
FIG. 4 shows a diagrammatic block view of a method according to an embodiment.

FIG. 4 is a diagrammatic block view of the method according to an embodiment. During or after movement 64 of a lift flap relative to the wing for forming a gap between the wing and the lift flap the curvature of the lift flap is changed 66 so that the gap between the lift flap and the profile of the wing downstream is continuously reduced. Subsequently, when the high lift system is to be deactivated, movement 68 of the lift flap towards the wing takes place, wherein as a result of placement of the lift flap onto a receiving surface or as a result of active pivoting back by way of an active component a change in the curvature in the reverse direction to the extension movement takes place 70.

Figure 5:
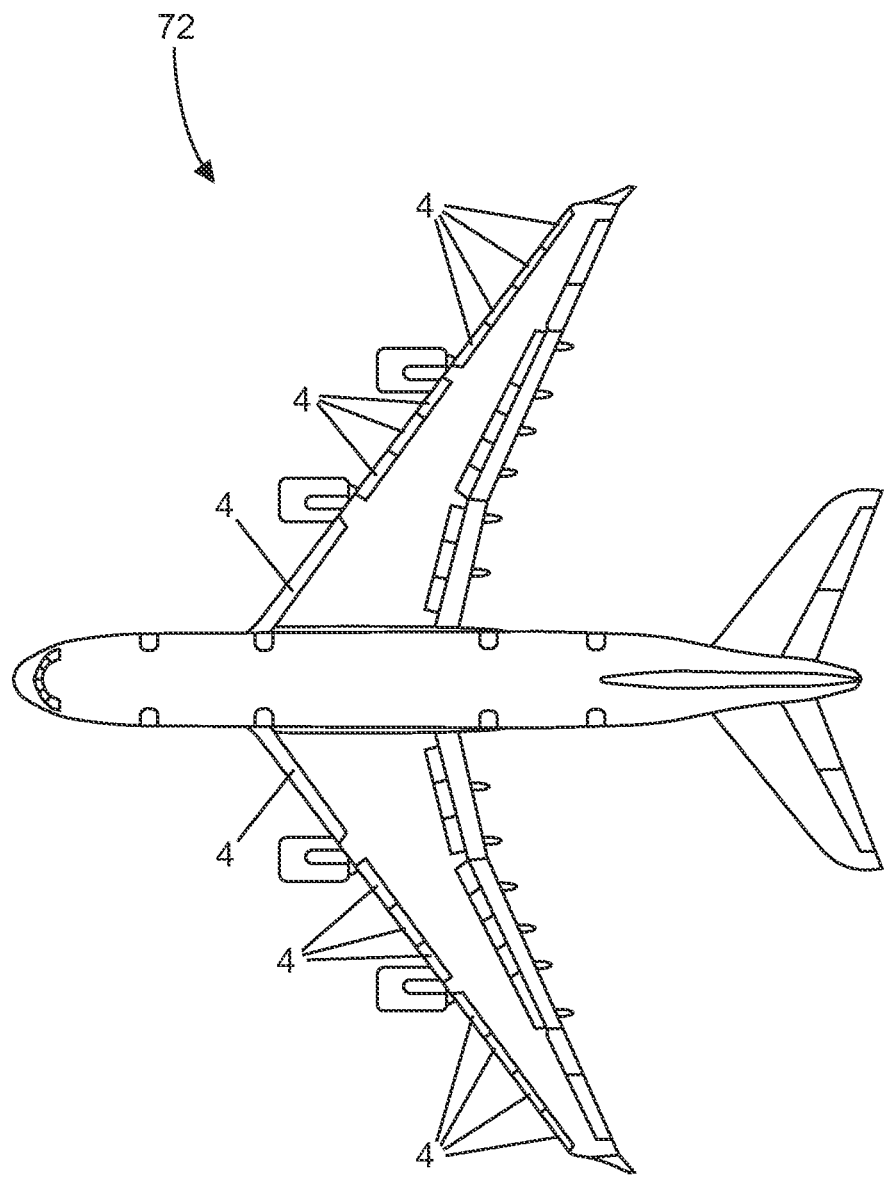
FIG. 5 shows an aircraft with at least one high lift system according to an embodiment.
Figures 6A, 6B:
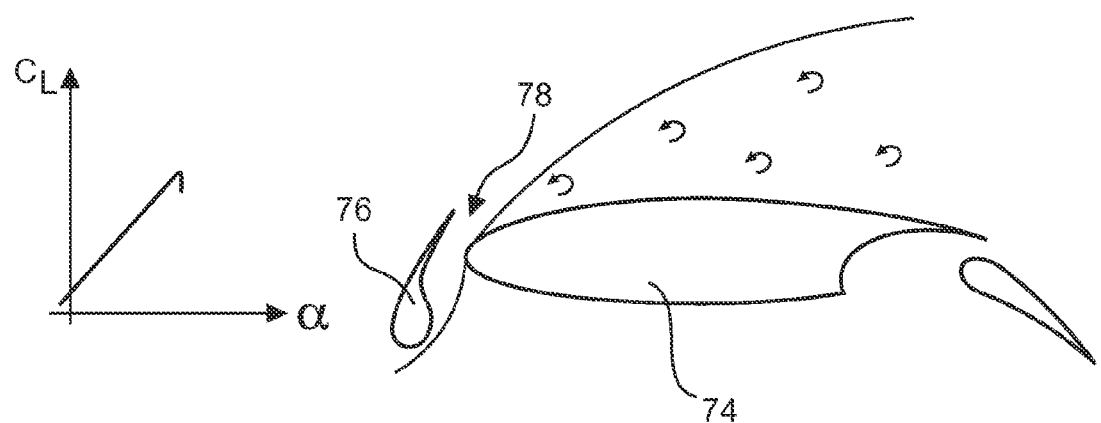
FIG. 6a to FIG. 6d show the achievable aerodynamic effect.

Furthermore, FIG. 5 shows an aircraft 72 with at least one high lift system according to the characteristics described above. FIG. 6a and FIG. 6b show the gradient of the lift $c_L$ over the angle of attack $\alpha$ for a wing 74 comprising a conventional high lift system, in which wing 74 a lift flap 76 on a leading edge of the wing 74 forms a predominantly divergent gap 78. At the shown angle of attack $\alpha$, the airflow stalls so that lift is no longer generated. The supply of high-energy flow onto the top of the wing 74 by way of the gap 78 no longer takes place in an optimal manner.

Figures 6C, 6D:
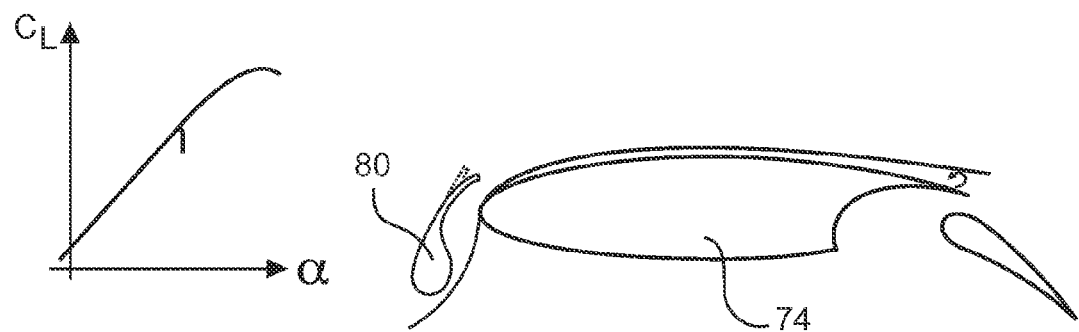

In contrast to this, in FIG. 6c and FIG. 6d a lift flap 80 is used on the wing 74, which lift flap 80 can prevent stall at the angle of attack $\alpha$ shown. The flow at the top of the wing 74 is present, and according to the diagram in FIG. 6c the achievable lift is at a considerably higher level than with the use of a conventional high lift system with a rigid lift flap 76, as is clearly evident from a comparison of FIG. 6a and FIG. 6c.

It should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. In addition, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A high lift system for an aircraft, comprising:
   a wing;
   a lift flap arranged on the wing and coupled to the wing so as to be movable relative to the wing, between a retracted position and at least one extended position, in the retracted position the lift flap is configured to rest against the wing, and in an extended position the lift flap is configured to form an air gap relative to the wing; and
   at least one region of the lift flap that includes at least one of a flexible material and a pivotable trailing edge that produces a variable curvature towards the trailing edge, which in the extended position of the lift flap extends towards the wing.

2. The high lift system of claim 1, wherein the lift flap in the extended position is offset upstream to a leading edge of the wing that comprises a curved profile.

3. The high lift system of claim 1, wherein the lift flap is configured to assume at least one first shape of curvature and a second shape of curvature.

4. The high lift system of claim 1, wherein the air gap extends between the trailing edge of the lift flap that is in the extended position and a surface of the wing which when assuming a first shape of curvature is convergent downstream.

5. The high lift system of claim 1, wherein the lift flap in a first shape of curvature is pre-formed.

6. The high lift system of claim 1, wherein the lift flap is at least partially formed of a fiber composite material.

7. The high lift system of claim 1, wherein the pivotable trailing edge is movable by way of an adjustment element, and the lift flap is adjustable by moving the pivotable trailing edge to a first shape of curvature and to a second shape of curvature.

8. The high lift system of claim 7, wherein the adjustment element is passive.

9. The high lift system of claim 7, wherein the adjustment element is an active actuator.

10. The high lift system of claim 7, wherein the pivotable trailing edge is a separate and pivotably held component.

11. The high lift system of claim 1, wherein the wing comprises a receiving surface against which the lift flap is pressed to assume a second shape of curvature.

12. The high lift system of claim 11, wherein the receiving surface comprises a receiving-surface protection device.

13. A method for moving a lift flap, comprising:
   moving the lift flap from a retracted position on a wing to an extended position, the lift flap including at least one region having at least one of a flexible material and a pivotable trailing edge that produces a variable curvature towards the trailing edge; and
   changing a curvature of the at least one region of the lift flap to a first shape of curvature.

14. The method of claim 13, further comprising:
   moving the lift flap to the retracted position towards the wing; and
   changing the curvature of the at least one region to a second shape of curvature.

15. An aircraft, comprising:
   two wings; and
   at least one high lift system, including:
   a lift flap arranged on a wing and coupled to the wing so as to be movable relative to the wing, between a retracted position and at least one extended position, in the retracted position the lift flap is configured to rest against the wing, and in an extended position the lift flap is configured to form an air gap relative to the wing,
   wherein the lift flap towards its trailing edge comprises at least one region that includes at least one of a flexible material and a pivotable trailing edge that produces a variable curvature, which in the extended position of the lift flap extends towards the wing.

16. The aircraft of claim 15, wherein the lift flap in the extended position is offset upstream to a leading edge of the wing that comprises a curved profile.

17. The aircraft of claim 15, wherein the lift flap is configured to assume at least one first shape of curvature and a second shape of curvature.

18. The aircraft of claim 15, wherein the air gap extends between the trailing edge of the lift flap that is in the extended position and a surface of the wing which when assuming a first shape of curvature is convergent downstream.

19. The aircraft of claim 15, wherein the lift flap is at least partially formed of a fiber composite material.

20. The high lift system of claim 1, wherein the air gap relative to the wing is devoid of a divergent region.

* * * * *